April 22, 1958 R. C. NORRIE ET AL 2,831,701
TRUCK-AND-TRAILER ASSEMBLY
Filed June 5, 1950 3 Sheets-Sheet 1
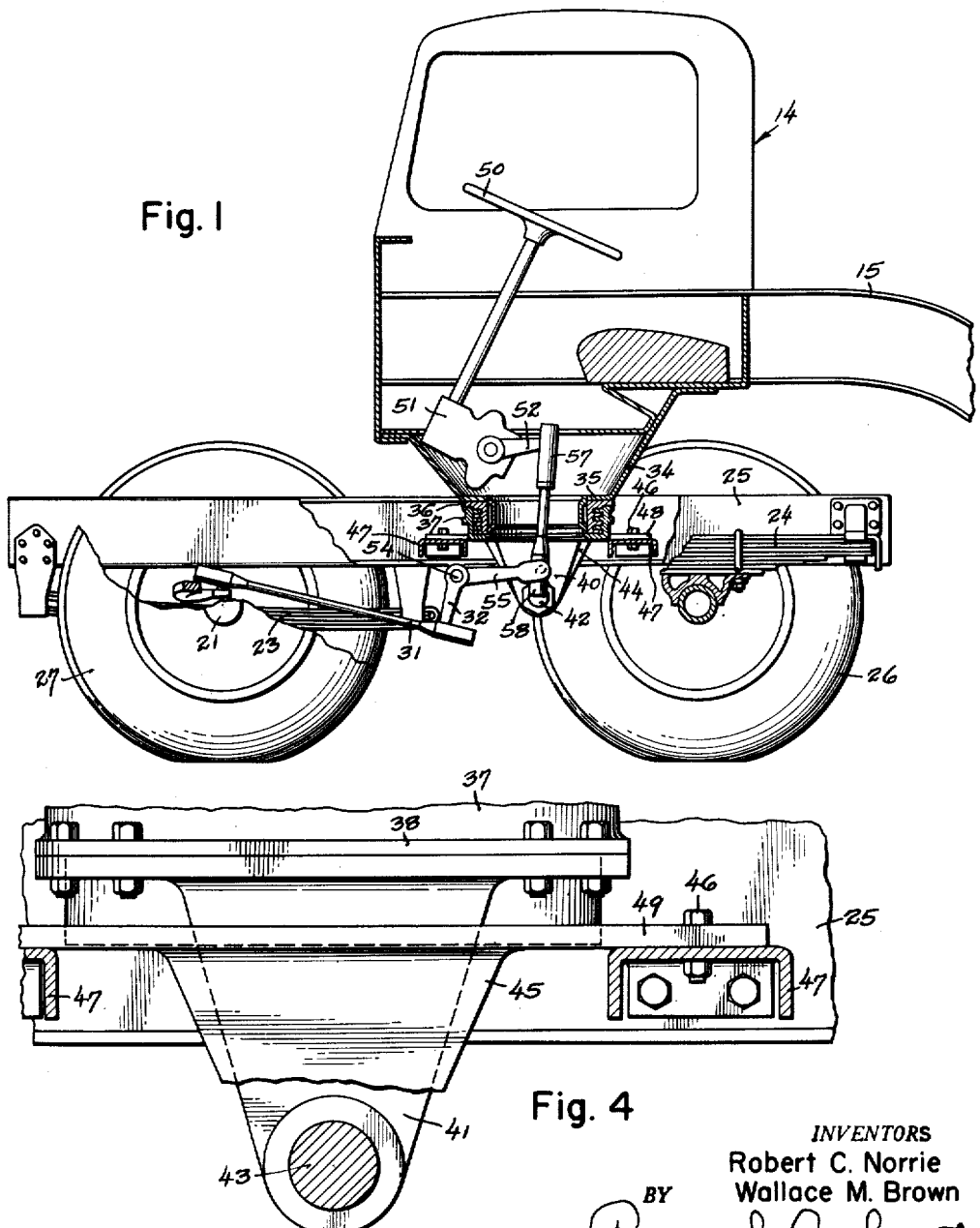
INVENTORS
Robert C. Norrie
Wallace M. Brown April 22, 1958  R. C. NORRIE ET AL  2,831,701
TRUCK-AND-TRAILER ASSEMBLY
Filed June 5, 1950  3 Sheets-Sheet 2

INVENTORS
Robert C. Norrie
Wallace M. Brown
BY

INVENTORS
Robert C. Norrie
Wallace M. Brown

United States Patent Office 2,831,701
Patented Apr. 22, 1958

2,831,701

TRUCK-AND-TRAILER ASSEMBLY

Robert C. Norrie and Wallace M. Brown, Seattle, Wash., assignors, by mesne assignments, to Pacific Car and Foundry Company, a corporation of Washington Application June 5, 1950, Serial No. 166,216

1 Claim. (Cl. 280—81.5)

This invention relates to wheeled vehicles, and particularly vehicles of a character having a steerable front truck in association with a semi-trailer. In this type of vehicle it has been heretofore usual to mount the driver's cab and the engine upon the steerable front truck, and with the pivotal connection for the trailer being located to the rear of the cab. The present invention has for its general object the provision of a vehicle of this nature having the cab made an integral part of the semi-trailer.

As a further and more particular object the present invention aims to engineer a vehicle of this type in which the pivotal connection between truck and trailer lies directly below the cab.

A yet further object is to devise a truck-and-trailer assembly employing the commonly termed "fifth-wheel" as a pivotal connection, with such fifth-wheel presenting a through-opening in its center, and to provide a steering hook-up in which one of a connected series of motion-transmitting arms, running from the steering wheel of the cab to the steerable wheels of the front truck, is received for bodily vertical movement within said through-opening and effectively serves to pass steering motions originating within the cab to the steerable wheels of the subjacent truck.

As a more particular object still and one ancillary to the above the invention aims to provide a steering hook-up running from the trailer-carried steering wheel to the steerable wheels of the truck compensating itself to pivotal motion between the trailer and the truck.

As a yet additional object, the invention purposes to provide a bogey front truck in which the tandem axles are spring-suspended from a bogey frame and embodying a perfected means for suspending said bogey frame from the fifth-wheel assembly to enable the frame to rock freely about a transverse horizontal axis and thus relieve the axle-suspending springs of any necessity to counter axle torque traceable to the travel of the vehicle over roads of changing contour.

With these and still more particular objects and advantages in view which will appear and be understood in the course of the following description and claim, the invention consists in the novel construction and in the adaptation and combination of parts hereinafter described and claimed.

In the accompanying drawings:

Figure 1 is a fragmentary longitudinal vertical sectional view portraying the front end of a truck-and-trailer assembly constructed to embody the teachings of the present invention and with the section drawn in part along the longitudinal median line of the vehicle and in part along the near side of the truck's frame.

Fig. 4 is a fragmentary longitudinal vertical sectional view drawn to a yet larger scale on line 4—4 of Fig. 3.

Figure 3:
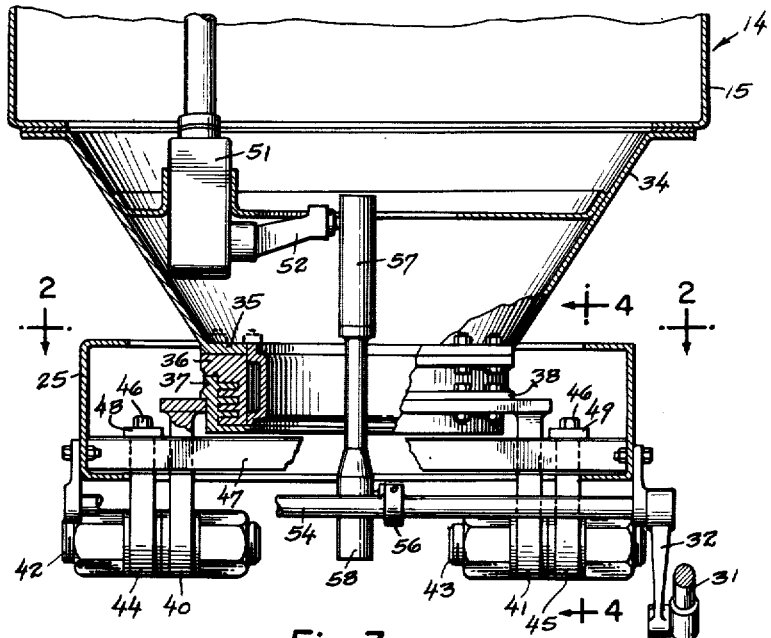
Fig. 3 is a fragmentary transverse vertical sectional view drawn to an enlarged scale on line 3—3 of Fig. 2.
Figure 2:
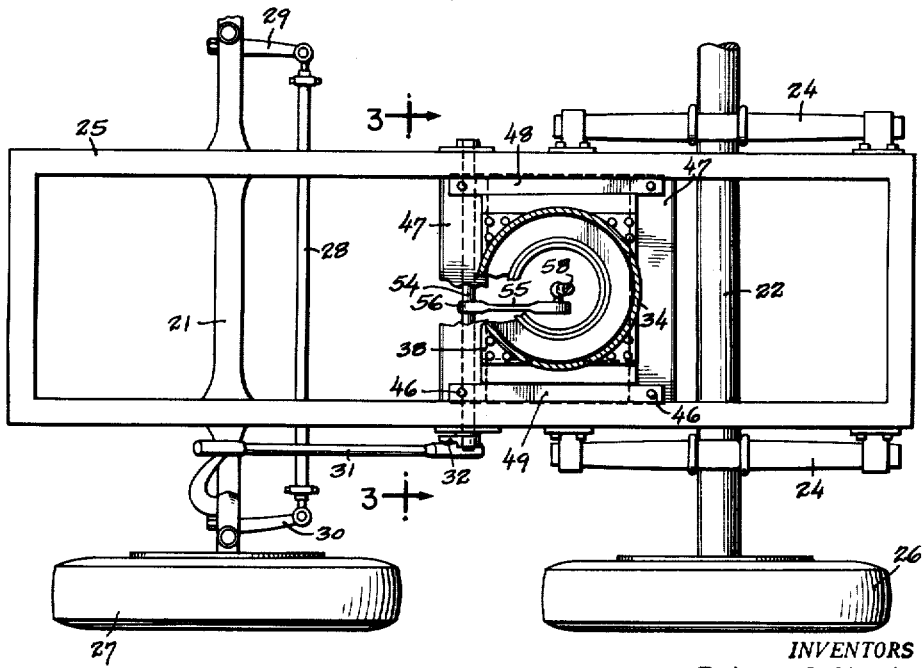
Fig. 2 is a fragmentary horizontal sectional view on line 2—2 of Fig. 3.
Figure 5:
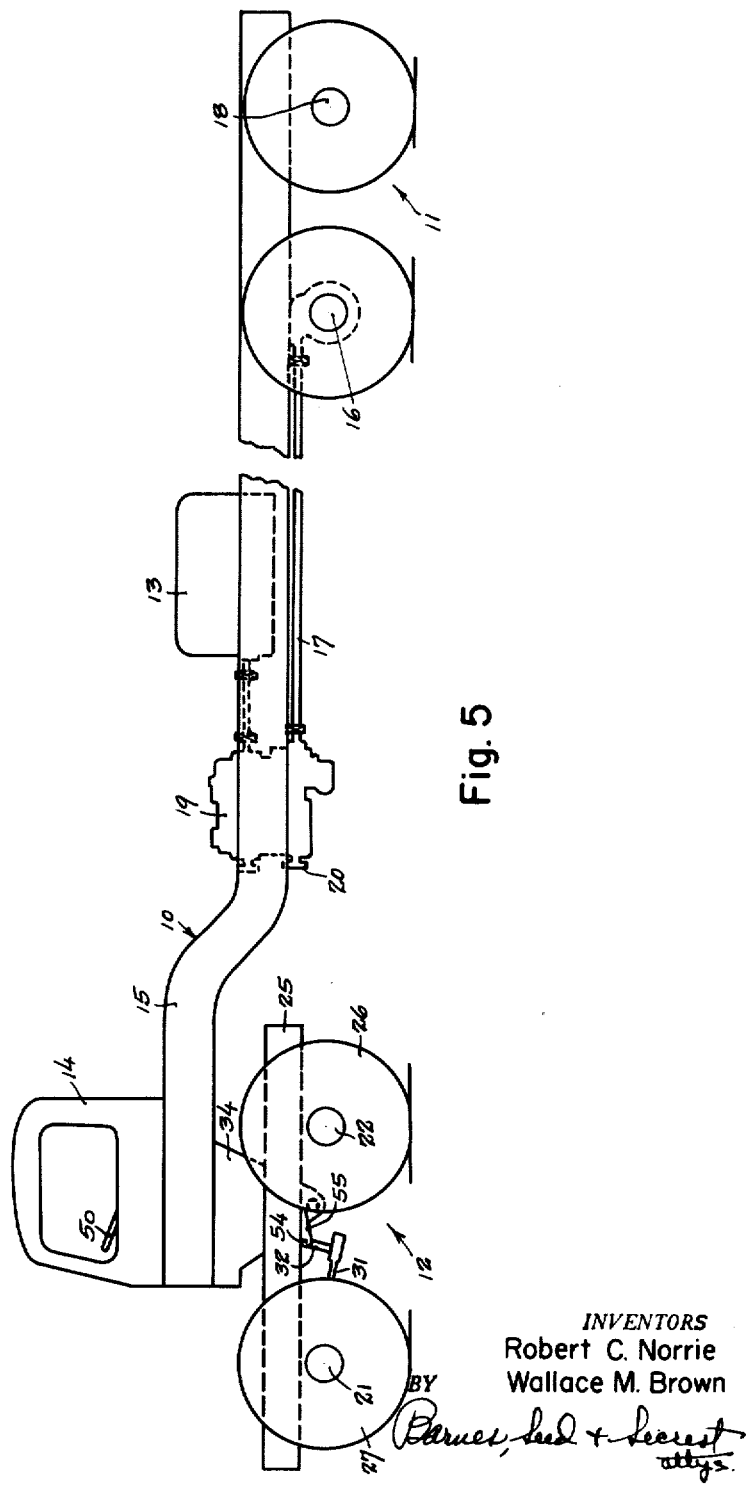
Fig. 5 is a schematic side elevational view illustrating the complete truck-and-trailer.

Before proceeding with a detailed description of the present invention, it is perhaps well to point out that the usual concept of a semi-trailer rig is one in which the axle or axles which give support to the rear end of the trailer are dead axles, and wherein the only traction given to the rig is from the wheels of a powered truck sustaining the front end of the trailer. It is customary, therefore, to think of semi-trailers as being used only in conjunction with ostensibly independent powered trucks usually termed tractors, the said tractors giving direct support to the engine which supplies power to the live axles and also having the driver's cab made a unitary part thereof. This arrangement of semi-trailer and tractor makes a very desirable rig for most trucking purposes but does have disadvantages, one of which is that the overall length of the rig, by the standards used in most States, is measured from the extreme rear end of the trailer to the extreme front end of the tractor, this method of measuring stemming from the fact that the employed tractor is considered a self-sufficient road vehicle separate and apart from the trailer. There are also, perforce, limits on overhanging. Consequently, where a call arises for a truck-and-trailer assembly especially engineered to carry a particular load of extended length and such, for example, as well-drilling equipment, it frequently occurs that a design following this usual concept of trailer-and-tractor runs afoul of the allowable length limit prescribed by the road regulation of certain States. The present invention, in order to meet this problem and to additionally provide a truck-and-trailer assembly which is advantageous in point of perfected traction, purposes to mount both the engine and the driver's cab upon the trailer proper and use the read-end wheels of the trailer for traction.

Broadly considered, the essential components of the present invention are the same as existing truck-and-trailer assemblies, and namely a semi-trailer designated generally by the numeral 10 supported by its rear end upon a bogey 11 and at its front end connecting by a fifth-wheel pivot with a steerable bogey 12. We intend that the term "bogey," as herein used, be given the meaning commonly accepted in the automotive industry, and namely "a combination of two axles usually pivoting about a common trunnion but which may be independently suspended." Reiterating that which has been previously said, the distinguishing characteristics may be broadly enumerated as follows: (1) both the engine 13 and the driver's cab 14 receive their support from the frame 15 of the trailer, and (2) one or both of the tandem rear axles of the rear-end bogey 11 are live axles driven from the engine. In the particular embodiment which we have elected to illustrate only the forwardly placed axle 16 of the two tandem rear axles is a live axle engine-driven by a propeller shaft 17 while the other axle 18 is a tag-along. It will be noted that the drive is shown as being passed from the engine into a transfer case 19 whence the same is or may be divided and carried both rearwardly and forwardly therefrom. Suffice it here to say that should the drive be carried forfardly as well as rearwardly from the transfer case the forward drive powers the rearwardly placed axle of the steerable front-end bokey 12. Where this augmenting traction is provided it perforce becomes necessary that the drive be engineered in such a manner as will compensate the same to swivel movements of the steerable bogey 12 about the center of the fifth wheel as an axis. Structure of this swing-compensating nature is the sole invention of Wallace M. Brown, one of the present two applicants, and is the subject matter of a separate patent issued August 11, 1953, No. 2,648,392. In the present disclosure we omit any showing of the front-end drive line but do, however, illustrate a coupling flange 20 serving, in instances where Brown's separate teaching are employed, as the instrumentality for taking divided power from the output end of the transfer case and passing the same through said front-end drive line to the front-end bogey.

Reverting now to the steerable front-end bogey, the same provides tandem front and rear axles 21 and 22, respectively, suitably suspended by springs 23 and 24 from a frame 25. We indicate the frame as being of a substantial rectangular form fabricated from channel-iron stock extending along the side and across the ends. Of the two sets of wheels carried by the tandem axles of said steerable front bogey, the rear wheels 26 are non-steerable and the front wheels 27 steerable, the mounting for such steerable wheels including the usual king-pin, knuckle, and spindle, and having the customary tie-rod, designated by 28, extending transversely between crank arms 29 and 30 fast to the knuckles. Also, as is customary, a drag-link 31 gives swinging motion to one of said connected knuckles, being itself moved by a pitman arm 32 fulcrumed from the frame to pivot about a transverse horizontal axis. This fulcrum lies approximately central to the length of the frame and occupies a position forwardly spaced from the transverse vertical plane occupied by the pivotal center of the fifth-wheel, hereinafter described, about which the front bogey turns.

The cab 14 of the present rig is rigid with the frame 15 of the trailer and is located at the extreme front end of the latter. Depending from the cab and made an integral part thereof is a hollow footing 34 of an inverted truncated cone shape having a mounting flange 35 at the bottom, and bolted or otherwise secured to this flange is the upper section of a fifth-wheel structure. The fifth-wheel which we have elected to illustrate is well-known within the industry, being one in which ring-shaped upper and lower sections, designated by 36 and 37, respectively, find an enclosed tongue-and-groove interfit and are lubricated by a self-contained sealed body of oil which is caused to circulate over the wear surfaces by pumping action which occurs as a direct result of vehicle movement.

A mounting flange 38 of rectangular shape in rim profile is made a secure part of the fifth-wheel's lower section 37. Bolted or otherwise secured to this flange 38 to occupy positions one at one and at the other side of the fifth-wheel are two hangers 40 and 41 having co-axial eyes at the lower ends serving to receive respective pivot bolts 42 and 43. A complementing hanger, as 44 and 45, also connects with each of said pivot-bolts, occupying a position to the outside of the related hanger 40 and 41, as the case may be. Each of said outside hangers presents an integral header bar, as 48 and 49, which extends transverse to the pivot axis of the hanger, and projecting ends of these bars seat upon and are bolted, as at 46, to transverse channel members 47 extending between and rigidly secured to the longitudinal side principals of the bogey frame. It will thus be seen that the front bogey is allowed to rock freely about the center of said pivot-bolts as an axis.

Proceeding now to describe the arrangement by which a driver occupying the cab transmits steering motions to the pitman arm 32, there is provided within the cab the usual steering column with the wheel 50 at the upper end thereof and a gear case 51 containing worm-and-worm-wheel reduction gearing at the lower end thereof. A lever arm 52 is caused to move in unison with the worm-wheel about the center of the latter as a pivot, and this lever arm, which extends longitudinally rearwardly from the base of the steering column, locates its free end on the approximate pivot line of the fifth-wheel. Occupying the center opening of the fifth-wheel is a vertically disposed drag-link composed of in-line upper and lower sections 57 and 58, respectively, interconnected so as to partake of relative swivel movement. The upper said drag-link section 57 is joined to the free end of said lever arm 52 by a ball-and-socket connection (not shown) of the usual or a suitable construction, and a similar ball-and-socket connection joins the lower drag-link section 58 to a horizontal lever arm 55. This latter arm extends forwardly from the drag-link and has its hub portion 56 pinned or otherwise fixedly secured to a transverse rocker shaft 54. The pitman arm 32 is pinned or otherwise secured to an end extremity of this rocker shaft and produces, together with the lever arm 54, the arm components of a substantial bell-crank.

From the foregoing it will be seen that the fifth-wheel lies directly below the cab and that the opening which occurs in the center of such wheel permits steering movements to be carried by standard mechanical connections from the interior of the cab to the steerable front wheels of the front-end bogey, free of interference with or from movable parts of the mounting.

It is thought that the invention, and its advantages, will have been clearly understood from the foregoing detailed description of the preferred illustrated embodiment. It is self-evident that changes from the illustrated and described embodiment may be resorted to without departing from the spirit of the invention and it is accordingly our intention that no limitations be implied and that the hereto annexed claims be given a scope fully commensurate with the broadest interpretation to which the employed language admits.

What we claim is:

In combination with the frame of a semi-trailer surmounted at its front end by a closed driver's cab and rigidly carrying at said front end one component of a fifth-wheel assembly, a unitary 2-axle wheeled truck of the bogey type having a frame from which the two axles of the bogey are suspended and carrying the functioning complement of said fifth-wheel component functionally engaging the latter, said truck being characterized in that the two wheels of the front axle are steerable wheels swivel-mounted for steering movements about separate vertical axes, and means operated from a position within the cab and having operative interconnection with said steerable wheels for imparting said steering movements thereto, said fifth-wheel assembly having a through-opening in its center, the means for imparting said steering movements to the steerable wheels including a drag-link received for vertical movement through said center opening with its upper end connected by a universal joint to the free end of one lever fulcrumed to the cab for vertical swinging movement about a horizontal axis and with its bottom end connected by a universal joint to the free end of a second lever fulcrumed to the frame of the bogey truck for vertical swinging movement about a horizontal axis, the drag-link comprising two in-line sections admitting to relative swivel movement about the longitudinal center line of the drag-link as an axis.

References Cited in the file of this patent

UNITED STATES PATENTS

| | | |
|---|---|---|
| 541,001 | Morris et al. | June 11, 1895 |
| 546,346 | Reynold | Sept. 17, 1895 |
| 670,405 | Hunter | Mar. 19, 1901 |
| 813,213 | Johnson | Feb. 20, 1906 |
| 839,068 | Kammann | Dec. 18, 1906 |
| 1,297,747 | Starr | Mar. 18, 1919 |
| 1,350,462 | Martin et al. | Aug. 24, 1920 |
| 1,646,131 | Barnes | Oct. 18, 1927 |
| 2,038,581 | Lent | Apr. 28, 1936 |
| 2,053,812 | Bradshaw | Sept. 8, 1936 |
| 2,091,009 | Osman | Aug. 24, 1937 |
| 2,140,109 | Kellar | Dec. 13, 1938 |
| 2,187,970 | Greer | Jan. 23, 1940 |
| 2,291,626 | Huber | Aug. 4, 1942 |
| 2,321,429 | Smith | June 8, 1943 |
| 2,354,300 | Bock | July 25, 1944 |
| 2,374,196 | Harbers | Apr. 24, 1945 |
| 2,539,733 | Dorsey | Jan. 30, 1951 |
| 2,597,481 | Harrah | May 29, 1952 |